US011799562B2

(12) United States Patent
Seyedi

(10) Patent No.: US 11,799,562 B2
(45) Date of Patent: *Oct. 24, 2023

(54) MITIGATION OF TEMPERATURE VARIATIONS AND CROSSTALK IN SILICON PHOTONICS INTERCONNECTS

(71) Applicant: HEWLETT PACKARD ENTERPRISE DEVELOPMENT LP, Houston, TX (US)

(72) Inventor: Mir Ashkan Seyedi, Palo Alto, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 182 days.

This patent is subject to a terminal disclaimer.

(21) Appl. No.: 16/890,929

(22) Filed: Jun. 2, 2020

(65) Prior Publication Data

US 2021/0376936 A1 Dec. 2, 2021

(51) Int. Cl.
  *H04B 10/80* (2013.01)
  *H04J 14/02* (2006.01)
  *G02B 6/293* (2006.01)
  *G02B 6/42* (2006.01)

(52) U.S. Cl.
  CPC ......... *H04B 10/801* (2013.01); *G02B 6/2938* (2013.01); *G02B 6/29338* (2013.01); *G02B 6/4246* (2013.01); *H04J 14/02* (2013.01)

(58) Field of Classification Search
  CPC .............. H04B 10/801; G02B 6/29338; G02B 6/2938; G02B 6/4246; H04J 14/02
  See application file for complete search history.

(56) References Cited

U.S. PATENT DOCUMENTS

| 7,636,522 | B2 | 12/2009 | Nagarajan et al. |
| 10,469,176 | B2 | 11/2019 | Rope et al. |
| 11,150,332 | B1* | 10/2021 | Chen .................... G06F 3/04182 |
| 11,233,577 | B1* | 1/2022 | Seyedi .................... H04B 10/40 |
| 2005/0089027 | A1 | 4/2005 | Colton et al. |
| 2009/0135866 | A1* | 5/2009 | Nishimura ........... H04B 10/504 372/34 |
| 2010/0271682 | A1* | 10/2010 | Smith .................... G02F 1/0123 359/239 |
| 2017/0302373 | A1* | 10/2017 | Yamakami ......... H04B 10/5057 |
| 2018/0149890 | A1* | 5/2018 | Cai .......................... G02F 1/025 |

(Continued)

OTHER PUBLICATIONS

Chittamuru, S.V.R. et al.; "Process Variation Aware Crosstalk Mitigation for DWDM based Photonic NoC Architectures"; 17th Int'l Symposium on Quality Electronic Design; Mar. 15-16, 2016; 6 pages: IEEE.

(Continued)

*Primary Examiner* — Mina M Shalaby
(74) *Attorney, Agent, or Firm* — Sheppard Mullin Richter & Hampton LLP

(57) ABSTRACT

An optical transceiver module includes a light source configured to emit light, a transmitter resonator configured to transmit light signals from the light source, a temperature sensor configured to detect temperatures of the transmitter resonator, and a controller circuit. The controller circuit is configured to obtain a first temperature variation value based on the detected temperatures, and encode the first temperature variation value via the transmitter resonator in an outgoing data stream.

8 Claims, 5 Drawing Sheets

(56) References Cited

U.S. PATENT DOCUMENTS

2021/0367397 A1* 11/2021 Shirai ................. H01S 5/06825
2021/0376936 A1* 12/2021 Seyedi .................. H04B 10/67
2021/0384980 A1* 12/2021 Li ........................ H04B 10/503

OTHER PUBLICATIONS

Zhang, T. et al.; "Thermal Management of Manycore Systems with Silicon-Photonic Networks"; Mar. 24-28, 2014; 6 pages; EDAA.

* cited by examiner

MITIGATION OF TEMPERATURE VARIATIONS AND CROSSTALK IN SILICON PHOTONICS INTERCONNECTS

DESCRIPTION OF RELATED ART

An optical network generally includes an optical transmitter, an optical receiver, and an optical fiber connected therebetween. To increase transmission capacity, a wavelength-division multiplexing (WDM) method is introduced. The WDM method allows multiple wavelengths to be transmitted in a single physical fiber, thus increasing bandwidth of the transmission. Optical interconnects in the optical network may be based on silicon photonics that use resonator-type modulators. A resonator-type modulator may be a ring resonator that includes a set of waveguides in which at least one may be a closed loop coupled to at least a light input port and a light output port. Due to its compatibility to fabrication processes of integrated circuits, the resonator-type modulators have a potential for various applications in optical communication network.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Generally, silicon photonics are subject to impacts from temperature variations. Various solutions for many of the thermal effects on the silicon photonics have been proposed. For example, integrated thermal controllers can be employed to control the temperatures of various components of silicon photonic devices. The goal is to achieve wavelength tracking and locking at the modulators. For example, existing technologies seek to measure bit error rate (BER) in the optical links and adjust temperatures of the transmitter and/or receiver ring modulators based on the BER counts. The temperatures of the transmitter and/or receiver ring modulators in the communication network are adjusted such that the BER counts are reduced to lower than a threshold.

Disclosed is an optical communication system that provides techniques to reduce network communication errors.

Silicon photonic technologies are employed in the optical communication system to provide a cost effective, high bandwidth, and low latency connections.

Ring resonators based on silicon photonic technologies generally are heated up as they are in operation. This can impact link quality and cause thermal shift for the wavelength of resonance of the transmitter rings with respect to the receiver rings. Techniques disclosed herein provide temperature synchronization algorithms in the optical communication system to enable accurate temperature control on the ring resonators at both the transmitter end and the receiver end, which can often be very far apart physically and in different temperature environments.

Silicon photonic technologies integrate optical transceivers and/or optical paths on a semiconductor substrate. Silicon photonic technologies can provide a hybrid device that includes both the electrical domain, e.g., a controller, and the optical domain, e.g., optical transceiver. The techniques disclosed herein also provide methods to leverage the silicon photonic technologies to provide reduced communication errors due to temperature variation and optical crosstalk to improve the overall performance of the optical communication system.

Figure 1:
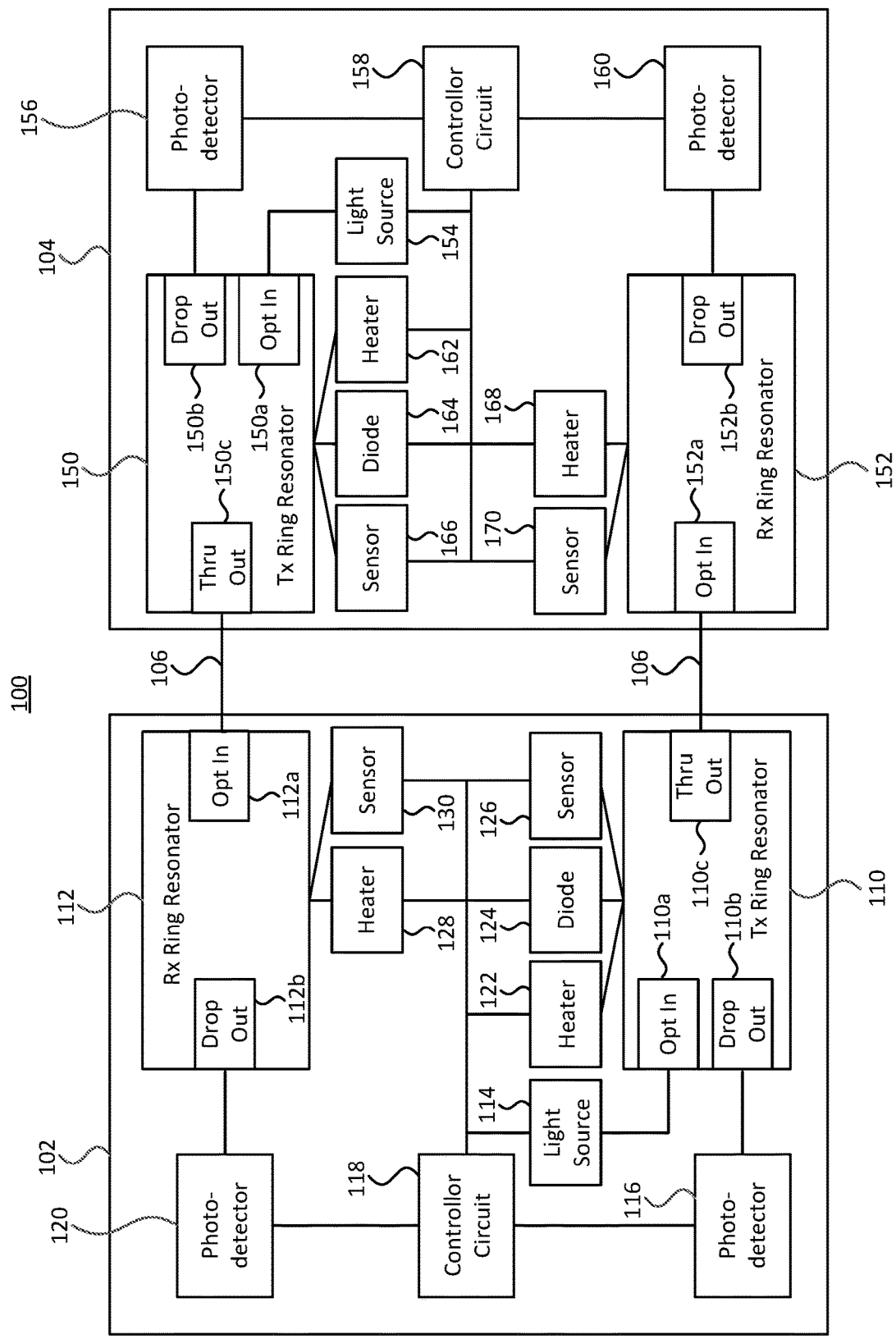
FIG. 1 illustrates an optical communication system according to one example embodiment.

Reference is now made to FIG. 1. FIG. 1 illustrates an optical communication system 100 according to one example embodiment. The optical communication system 100 includes a first transceiver module 102 and a second transceiver module 104. It should be understood that although two transceiver modules are illustrated in FIG. 1, more transceiver modules can be included in the optical communication system 100. The first transceiver module 102 and the second transceiver module 104 are connected to each other through optical cables 106.

The first transceiver module 102 includes a transmitter (Tx) ring resonator 110 and a receiver (Rx) ring resonator 112. The Tx ring resonator 110 includes an optical input port (Opt In) 110a, an optical output port (Drop Out) 110b, and a pass-through port (Thru Out) 110c. The optical input port 110a is coupled to a light source 114 and configured to receive input optical signals for the Tx ring resonator 110. The optical output port 110b is coupled to a Tx photodetector 116. Optical signals designated for Tx ring resonator 110 are filtered at the optical output port 110b and can be detected by the Tx photodetector 116. The Tx photodetector 116 is configured to detect light signals at the optical output port 110b and convert the optical signals to electrical signals. In some embodiments, the Tx photodetector 116 may be a photodiode. Optical signals designated for output are filtered at pass-through port 110c to be transmitted to a destination, for example, an Rx ring resonator 152 at the second transceiver module 104.

The Rx ring resonator 112 includes an optical input port (Opt In) 112a and an optical output port (Drop Out) 112b. The optical input port 112a is configured to receive optical signals from an external source, e.g., a Tx ring resonator 150 of the second transceiver module 104. The Rx ring resonator 112 is configured to modulate and output the received optical signals at the optical output port 112b. An Rx photodetector 120 is coupled to the optical output port 112b and configured to detect optical signals at the optical output port 112b. In some embodiments, the Rx photodetector 120 may be a photodiode.

The first transceiver module 102 further includes a controller circuit 118 configured to control the operations of the Tx ring resonator 110 and the Rx ring resonator 112. The first transceiver module 102 also includes a Tx heater 122, a diode 124, and a Tx temperature sensor 126 disposed at or close to the Tx ring resonator 110, and an Rx heater 128 and an Rx temperature sensor 130 disposed at or close to the Rx ring resonator 112. The controller circuit 118 is coupled to the light source 114, the Tx photodetector 116, the Rx photodetector 120, the Tx heater 122, the diode 124, the Tx temperature sensor 126, the Rx heater 128, and the Rx temperature sensor 130. The controller circuit 118 is configured to provide control signals to these components to perform various functions described herein. In some embodiments, the controller circuit 118 may be an application-specific integrated circuit (ASIC).

The light source 114 may be laser diodes configured to emit light signals at various wavelengths. The light signals from the light source 114 are received at the Tx input port 110a, modulated by the Tx ring resonator 110, and then transmitted at the Tx pass-through port 110c. The Tx heater 122 is configured to provide thermal energy to adjust the temperature of the Tx ring resonator 110. The diode 124 is configured to modulate light signals based on control signals provided by the controller circuit 118. In some embodiments, the diode 124 is configured to modulate light signals in a speed at the order of nanoseconds or faster. The Tx temperature sensor 126 is configured to detect temperatures of the Tx ring resonator 110. The temperature readings are sent to the controller circuit 118 to implement temperature synchronization techniques disclosed herein. The Tx photodetector 116 is configured to detect optical signals at the optical output port 110b, convert the detected optical signals to electrical signals, and send the electrical signals to the controller circuit 118 to implement various control techniques disclosed herein. The controller circuit 118, when performing control functions related to the Tx ring resonator 110, can be referred to as a Tx controller circuit.

The Rx heater 128 is configured to provide thermal energy to adjust the temperature of the Rx ring resonator 112. The Rx temperature sensor 130 is configured to detect temperatures of the Rx ring resonator 112. The temperature readings are sent to the controller circuit 118 to implement temperature synchronization techniques disclosed herein. The Rx photodetector 120 is configured to detect optical signals at the optical output port 112b, convert the detected optical signals to electrical signals, and send the electrical signals to the controller circuit 118 to implement various control techniques disclosed herein. The controller circuit 118, when performing control functions related to the Rx ring resonator 112, can be referred to as Rx controller circuit.

The second transceiver module 104 includes a Tx ring resonator 150 and an Rx ring resonator 152. The Tx ring resonator 150 includes an optical input port (Opt In) 150a, an optical output port (Drop Out) 150b, and a pass-through port (Thru Out) 150c. The optical input port 150a is coupled to a light source 154 and configured to receive input optical signals for the Tx ring resonator 150. The optical output port 150b is coupled to a Tx photodetector 156. Optical signals designated for Tx ring resonator 150 are filtered at the optical output port 150b and can be detected by the Tx photodetector 156. In some embodiments, the Tx photodetector 156 may be a photodiode. Optical signals designated for output are filtered at the pass-through port 150c to be transmitted to a destination, for example, the Rx ring resonator 112 at the first transceiver module 102. In the illustrated example in FIG. 1, the pass-through port 150c at the second transceiver module 104 is connected to the optical input port 112a at the first transceiver module 102 via the optical cable 106.

The Rx ring resonator 152 includes an optical input port (Opt In) 152a and an optical output port (Drop Out) 152b. The optical input port 152a is configured to receive optical signals from an external source, e.g., the Tx ring resonator 110 of the first transceiver module 102. In the illustrated example in FIG. 1, the optical input port 152a at the second transceiver module 104 is connected to the pass-through port 110c at the first transceiver module 102 via the optical cable 106. The Rx ring resonator 152 is configured to modulate and output the received optical signals at the optical output port 152b. An Rx photodetector 160 is coupled to the optical output port 152b and configured to detect optical signals at the optical output port 152b.

The second transceiver module 104 further includes a controller circuit 158 configured to control the operations of the Tx ring resonator 150 and the Rx ring resonator 152. The second transceiver module 104 also includes a Tx heater 162, a diode 164, and a Tx temperature sensor 166 disposed at or close to the Tx ring resonator 150, and an Rx heater 168 and an Rx temperature sensor 170 disposed at or close to the Rx ring resonator 152. The controller circuit 158 is coupled to the light source 154, the Tx photodetector 156, the Rx photodetector 160, the Tx heater 162, the diode 164, the Tx temperature sensor 166, the Rx heater 168, and the Rx temperature sensor 170. The controller circuit 158 is configured to provide control signals to these components to perform various functions described herein. In some embodiments, the controller circuit 158 may be an application-specific integrated circuit (ASIC). The functions of the components of the second transceiver module 104 are similar to corresponding components of the first transceiver module 102 and can be referred to the above description.

The optical signals communicated in the optical cables 106 may be based on dense wavelength-division multiplexing (DWDM) technology, or other suitable optical communication protocols currently existed or hereinafter developed.

The techniques described herein are mainly from the perspective of the first transceiver module 102, although it should be understood that the techniques can be applied to any transceiver module in the optical communication system 100, including the second transceiver module 104. Similarly, when techniques described herein are from the perspective of the second transceiver module 104, they can be equally applied to the first transceiver module 102.

In the boot up stage at the first transceiver module 102, the controller circuit 118 is configured to provide control signals the Tx heater 122 to prepare the Tx ring resonator 110 at an operation temperature. Once the Tx ring resonator 110 is at the operation temperature, the controller circuit 118 controls the light source 114 to emit light and diode 124 to begin modulate the Tx ring resonator 110. The controller circuit 118 instructs the Tx temperature sensor 126 to report temperature readings of the Tx ring resonator 110. The Tx temperature sensor 124 may be configured to periodically (e.g., at a one-second interval) detect and report the temperature readings of the Tx ring resonator 110 to the controller circuit 118. Based on the temperature readings, the controller circuit 118 may calculate a temperature variation value. For example, the controller circuit 118 may compare a current temperature reading with a previous temperature reading to obtain the temperature variation value. As a non-limiting example, temperature variation value may be 1° C., 5° C., −1° C., −5° C., etc. In some instances, the temperature variation value may be zero, indicating that there is no temperature change at the Tx ring resonator 110 over the detection interval.

When the temperature variation value is a non-zero value, the controller circuit 118 is configured to encode the temperature variation value via the Tx ring resonator 110 in an outgoing data stream. For example, the controller circuit 118 may control the diode 124 to write the temperature variation value at a designated section of the outgoing data stream. As a non-limiting example, the designated section may a header of a data packet or a data section reserved specifically for the temperature variation value. This technique allows the communication of the actual temperature variation at the Tx ring resonator 110 to a receiver module, e.g., the Rx ring resonator 152 of the second transceiver module 104 so that the second transceiver module 104 can adjust the temperature of the Rx ring resonator 152 based on the received temperature variation value. For example, after the data stream is received at the Rx ring resonator 152 of the second transceiver module 104, the photodetector 160 converts the received optical signals into electrical signals and forwards the electrical signals to the controller circuit 158. The controller circuit 158 extracts the temperature variation value from the electrical signals and controls the Rx heater 168 to adjust the temperature of the Rx ring resonator 152 based on the temperature variation value. The techniques enable the an Tx ring resonator and a Rx ring resonator to synchronize their temperature shifts, which in turn reduces data communication errors.

The temperature variation values, even if zero, may be periodically encoded in the data stream from the Tx ring resonator 110 of the first transceiver module 102 to the Rx ring resonator 152 of the second transceiver module 104. If the temperature variation value is zero, the controller circuit 158 does not adjust the temperature of Rx ring resonator 152. In some implementations, after the controller circuit 118 of the first transceiver module 102 obtains the temperature variation value based on the detected temperatures of the Tx ring resonator 110, the controller circuit 118 may be configured to determine whether the temperature variation value is greater than a threshold. If the temperature variation value is greater than the threshold, the controller circuit 118 is configured to encode the temperature variation value via the Tx ring resonator 110 in the outgoing data stream. If the temperature variation value is equal to or less than the threshold, the controller circuit 118 does not encode the temperature variation value in the outgoing data stream even if the temperature variation value is a non-zero value. This technique may prevent the controller circuit 158 of the second transceiver module 152 from adjusting the temperature of the Rx ring resonator 152 based on trivial temperature variations at the Tx ring resonator 110.

In some embodiments, the controller circuit 118 may classify temperature variation values of the Tx ring resonator 110 into multiple levels, each presented by a temperature code. As a non-limiting example, a level may represent 1° C. variation. For example, temperature variation values of 2.1° C. and 2.9° C. may be classified at the same level, while 1.9° C. and 2.1° C. are classified at different levels. The controller circuit 118 may then encode the temperature code via the Tx ring resonator 110 in the outgoing data stream. Based on the temperature code, the controller circuit 158 controls the heater 168 to adjust the temperature of the Rx ring resonator 152. In some embodiments, the level distance may be progressive. As a non-limiting example, a lower level may have a greater level distance than that of a higher level. In one implementation, for example, level 1 may be 0-3° C., level 2 may be 3-4.5° C., level 3 may be 4.5-5.5° C. A progressive level classification may reflect that smaller temperature variation values may not significantly disrupt data communications between the Tx ring resonator 110 and the Rx ring resonator 152, while larger temperature variation values tend to negatively affect the integrity of the data communications.

Alternatively or additionally, the controller circuit 118 of the first transceiver module 102 may encode raw temperature readings from the Tx temperature sensor 126 into the data stream. The controller circuit 158 of the second transceiver module 104 may extract the temperature readings from the data stream and control the Rx heater 168 to adjust the temperature of the Rx ring resonator 152.

These techniques enable the Tx ring resonator 110 and the Rx ring resonator 152 to synchronize their temperatures so as to provide a stable data communication therebetween. In contrast to the conventional schemes where temperatures are indirectly measured with link quality parameters such as BER counts, the techniques disclosed herein employ actual temperature parameters, e.g., temperatures variation values and/or temperature readings. Because the actual temperature parameters are encoded in the data stream, the receiving end can adjust the temperature of its Rx ring resonator with better accuracy and less complexity.

In some embodiments, similar techniques may be employed to communicate the temperature variations at the Rx ring resonator 112 of the first transceiver module 102 to the second transceiver module 104 to enable the controller circuit 158 to adjust the temperature of the Tx ring resonator 150. For this purpose, each of the Rx ring resonators 112 and 152 are provided with an Rx temperature sensor 130 or 170 to obtain temperature readings at the Rx ring resonators 112 and 152. Temperature readings from the Rx temperature sensor 130 or 170 can be converted into temperature variation values by the controller circuit 118 or 158 as explained above. The controller circuit 118 or 158 then encodes the temperature variation values via the Tx ring resonator 110 or 150 in data streams destined for the opposing transceiver module.

The Tx ring resonator 110 may be employed to encode other system parameters in the data streams. For example, as the Tx ring resonator 110 is encoding data in the data streams, crosstalk may be induced at the Tx ring resonator 110 among the optical channels. Based on DWDM technology, the Tx ring resonator 110 may be configured to output signals in a plurality of optical channels, where each of the optical channels is operated with a different wavelength. As Tx ring resonator 110 encodes data into data streams in one optical channel at the pass-through port 110c, it may cause crosstalk or noise to show in another optical channel. The crosstalk can be observed when a compliment of the data stream that is encoded at the pass-through port 110c may be optically present at the output port 110b. One major cause of crosstalk comes from a carrier-injection modulator (e.g., the Tx ring resonator 110) producing a "blue shift" or a spectral shift to higher frequencies, as the Tx ring resonator 110 is turned on.

To obtain crosstalk data, the controller circuit 118 is configured to analyze the optical signals at the output port 110b. Specifically, the optical signals at the output port 110b are captured and converted by the Tx photodetector 116 into electrical signals. The controller circuit 118 obtains the electrical signals from the Tx photodetector 116. The controller circuit 118 is then configured to compare signals from a first optical channel operated with a longest wavelength among the optical channels with signals in a second optical channel next to the first optical channel. Based on the comparison, the controller circuit 118 is configured to extract crosstalk data imposed on the second optical channel by the signals from the first optical channel. Once the crosstalk data is obtained, the controller circuit 118 is configured to encode the crosstalk data via the Tx ring resonator 110 in subsequent signals in the second optical channel. The signals and subsequent signals from the second optical channel are output in a data stream at the pass-through port 110c and transmitted, via the optical cable 106, to the input port 152a of the Rx ring resonator 152 of the second transceiver module 104.

Upon receiving the data stream at the Rx ring resonator 152, the Rx photodetector 160 is configured to detect the signals and subsequent signals from the second optical channel. The controller circuit 158 is then configured to extract the crosstalk data encoded in the subsequent signals from the second optical channel, and subtract the crosstalk data from the signals received prior to the subsequent signals. These techniques allow the receiving side to remove crosstalk generated at the transmitting side (e.g., at the Tx ring resonator 110 or 150) so a clearer form of data signals can be obtained.

These techniques can be applied to each of the optical channels operated by the Tx ring resonator 110 (or 150) except the first optical channel that is operated with the longest wavelength at the Tx ring resonator 110 (or 150). The controller circuit 118 (or 158) is configured to encode no crosstalk data in output signals in the first optical channel. This is because the first optical channel experiences no crosstalk as it is operated with the lowest carrier frequency. A general description for the techniques is provided herein. In some embodiments, a controller circuit (e.g., the controller circuit 118 or 158) is configured to: compare signals from an $n^{th}$ optical channel with signals from an $(n+1)^{th}$ optical channel next to the $n^{th}$ optical channel, extract $n^{th}$ crosstalk data imposed on the $(n+1)^{th}$ optical channel by the signals from the $n^{th}$ optical channel, and encode the $n^{th}$ crosstalk data via the transmitter resonator in subsequent output signals in the $(n+1)^{th}$ optical channel.

Figure 2:
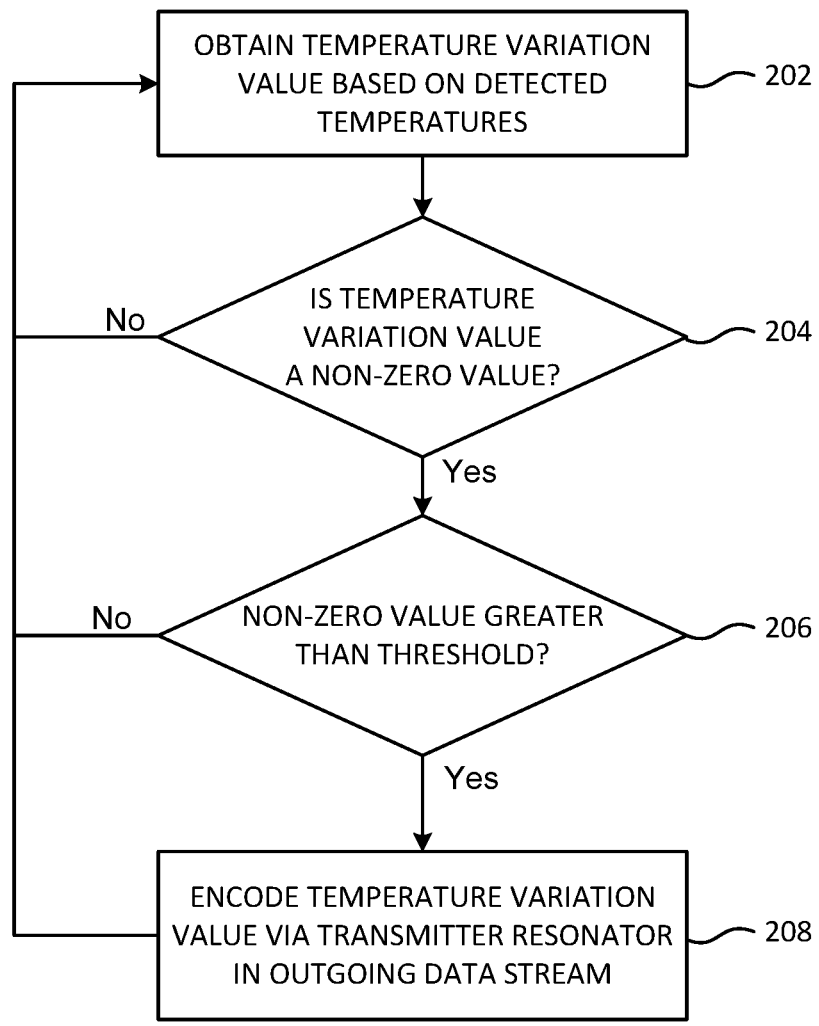
FIG. 2 is a flow chart illustrating a method for providing temperature parameters of a transmitter ring resonator to a receiver module in an optical communication system, according to one example embodiment.

Reference is now made to FIG. 2. FIG. 2 is a flow chart illustrating a method 200 for providing temperature parameters of a Tx ring resonator to a receiver module in an optical communication system, according to one example embodiment. The method 200 can be performed by a controller circuit (e.g., the controller circuit 118 or 158 in FIG. 1) of a transmitter module (e.g., the transceiver module 102 or 104) in the optical communication system. At 202, the controller circuit obtains a temperature variation value based on detected temperatures of the Tx ring resonator. To detect temperatures of the Tx ring resonator, a temperature sensor (e.g., the Tx temperature sensor 126 or 166 in FIG. 1) is employed. The temperature sensor is configured to detect temperatures of the Tx ring resonator periodically or upon request. The temperature readings from the temperature sensor is provided to the controller circuit to calculate at least one temperature variation value to indicate the temperature variation at the Tx ring resonator over a period of time.

At 204, the controller circuit determines whether the temperature variation value is a non-zero value. If the temperature variation value is a zero value (No at 204), the method 200 returns to 202. When the temperature variation value is a zero value, it indicates that no temperature variation is detected at the Tx ring resonator and thus there is no need to inform the receiver module of any temperature variation. If the temperature variation value is a non-zero (Yes at 204), at 206 the controller circuit determines whether the non-zero value is greater than a temperature variation threshold. If the non-zero value is equal to or less than the temperature variation threshold (No at 206), the method 200 returns to 202. When the non-zero value is equal to or less than the temperature variation threshold, it indicates that the temperature variation at the Tx ring resonator is not significant to warrant a notice to the receiver module. If the non-zero value is greater than the temperature variation threshold (Yes at 206), at 208 the controller circuit encodes the temperature variation value via the Tx ring resonator in an outgoing data stream destined to the receiver module. The temperature variation value enables the receiver module to make a corresponding temperature adjustment to its Rx ring resonator coupled to the Tx ring resonator of the transmitter module.

In some implementations, one or both operations 204 and 206 may be omitted. Depending on operation protocols defined for a transmitter module and a receiver module, when operations 204 and 206 are omitted at the transmitter module, they can be performed by the receiver module in determining whether to adjust the temperature of its Rx ring resonator. An example is shown in FIG. 3.

Figure 3:
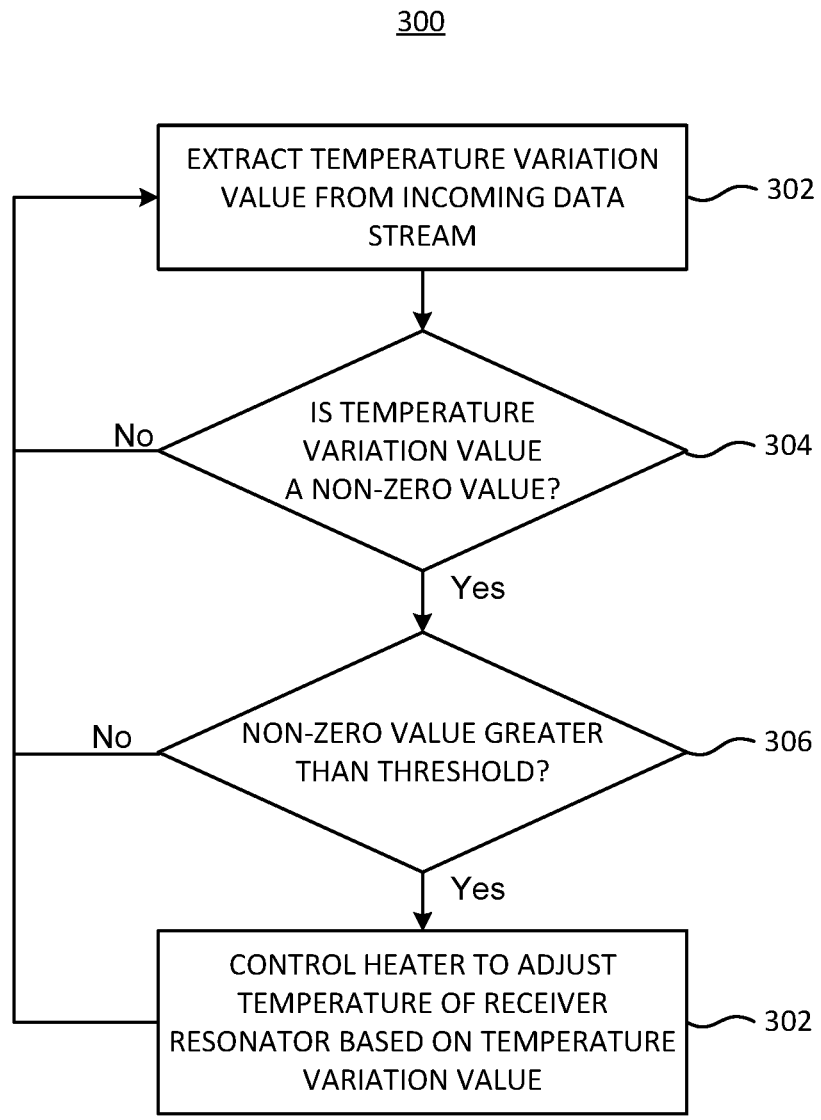
FIG. 3 is a flow chart illustrating a method for adjusting temperatures of an receiver ring resonator of a receiver module in an optical communication system, according to one example embodiment.

FIG. 3 is a flow chart illustrating a method 300 for adjusting temperatures of an Rx ring resonator of a receiver module in an optical communication system, according to one example embodiment. The method 300 can be performed by a controller circuit (e.g., the controller circuit 118 or 158 in FIG. 1) of a receiver module (e.g., the transceiver module 102 or 104) in the optical communication system. At 302, the controller circuit extracts a temperature variation value from an incoming data stream. The controller circuit obtains the incoming data stream from a photodetector coupled to an Rx ring resonator of the receiver module.

At 304, the controller circuit determines whether the temperature variation value is a non-zero value. If the temperature variation value is a zero value (No at 304), the method 300 returns to 302. When the temperature variation value is a zero value, it indicates that no temperature variation is detected at a Tx ring resonator of a transmitter module and thus there is no need to adjust the temperature of the Rx ring resonator. If the temperature variation value is a non-zero (Yes at 304), at 306 the controller circuit determines whether the non-zero value is greater than a temperature variation threshold. If the non-zero value is equal to or less than the temperature variation threshold (No at 306), the method 300 returns to 302. When the non-zero value is equal to or less than the temperature variation threshold, it indicates that the temperature variation at the Tx ring resonator is not significant to warrant an adjustment to the temperature of the Rx ring resonator. If the non-zero value is greater than the temperature variation threshold (Yes at 306), at 308 the controller circuit controls a heater for the Rx ring resonator to adjust the temperature of the Rx ring resonator based on the temperature variation value. In some implementations, one or both operations 304 and 306 may be omitted.

Figure 4:
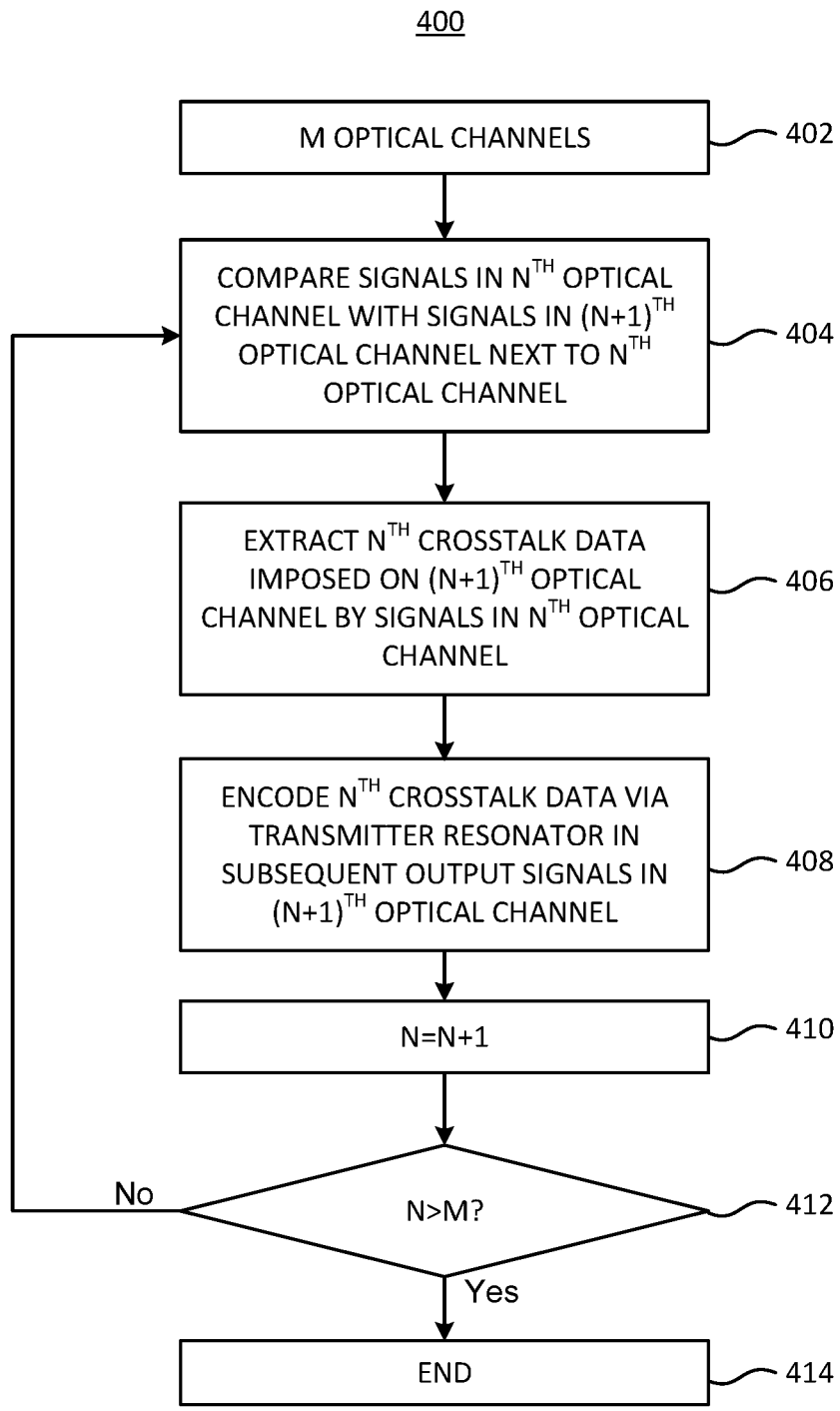
FIG. 4 is a flow chart illustrating a method for providing crosstalk data of a transmitter ring resonator to a receiver module in an optical communication system, according to one example embodiment.

FIG. 4 is a flow chart illustrating a method 400 for providing crosstalk data of a Tx ring resonator of a transmitter module to a receiver module in an optical communication system, according to one example embodiment. The method 400 can be performed by a controller circuit (e.g., the controller circuit 118 or 158 in FIG. 1) of a transmitter module (e.g., the transceiver module 102 or 104 in FIG. 1) in the optical communication system. At 402, the controller circuit sets up m optical channels for communication at the Tx ring resonator. Each of the m optical channels is operated with a different wavelength. At 404, the controller circuit compares signals from an $n^{th}$ optical channel with signals from an $(n+1)^{th}$ optical channel that is next to the $n^{th}$ optical channel, where the $n^{th}$ optical channel is operated with a wavelength longer than that of the $(n+1)^{th}$ optical channel. The controller circuit may obtain the signals from the $n^{th}$ optical channel and the signals from an $(n+1)^{th}$ optical channel from a feedback loop of the transmitter module. For example, referring to FIG. 1, the controller circuit 118 instructs the diode 124 to modulate the Tx ring resonator to encode data signals in optical channels. As the Tx ring resonator 110 encodes data signals to be transmitted from the pass-through port 110c in an optical channel, a compliment of the data signals is imposed at the output port 110b and can be detected by the Tx photodetector 116, which then transmits the data signals to the controller circuit 118. As a result, the data signals from the optical channel can be obtained by controller circuit 118. A feedback loop is formed with the controller circuit 118, the diode 124, the Tx ring resonator 102, and the Tx photodetector 116.

Based on the comparison at 404, at 406 the controller circuit extracts $n^{th}$ crosstalk data imposed on the $(n+1)^{th}$ optical channel by the signals from the $n^{th}$ optical channel. At 408, the controller circuit encodes the $n^{th}$ crosstalk data via the Tx ring resonator in subsequent output signals in the $(n+1)^{th}$ optical channel. As the crosstalk data observed at the $(n+1)^{th}$ optical channel is encoded in the same optical channel, the receiver module can extract the crosstalk data from the very optical channel that sends the data signals that needs correction. Other encoding techniques are contemplated. For example, all pieces of crosstalk data for multiple optical channels can be sent by any one of the optical channel. In this implementation, each piece of crosstalk data may be given an identifier to indicate the respective optical channel that is affected by the crosstalk data such that the receiver module can correctly subtract the crosstalk data from respective data signals. As a non-limiting example, all pieces of crosstalk data for multiple optical channels can be sent by the optical channel that is operated with the longest wavelength. As explained above, the optical channel operated with the longest wavelength does not experience crosstalk induced by a neighboring channel. This allows the crosstalk data to be encoded to a clean carrier wave.

At 410, the controller circuit proceeds to process crosstalk at a next optical channel, i.e., the $(n+1)^{th}$ optical channel. At 412, the controller circuit determines whether all m optical channels have been processed for crosstalk data encoding. That is controller circuit determines whether N is greater than M. If one or more optical channels have not been processed for crosstalk data encoding (No at 412), the method 400 returns to 404 to iterate the operations 404-412 to encode crosstalk data for another optical channel. If all m optical channels have been processed for crosstalk data encoding (Yes at 412), the method 400 ends at 414.

Figure 5:
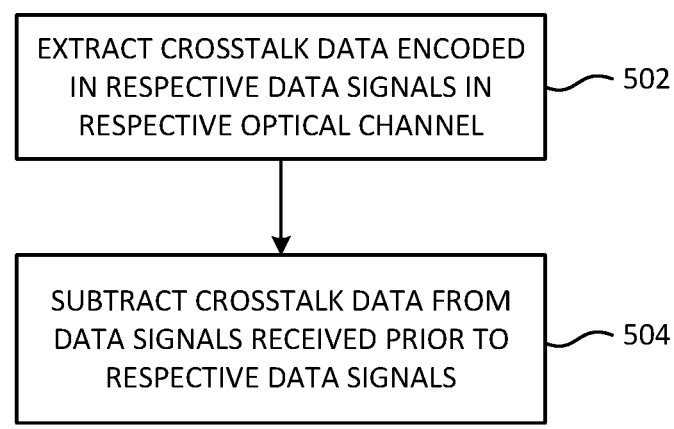
FIG. 5 is a flow chart illustrating a method for mitigating crosstalk in data signals received at a receiver module in an optical communication system, according to one example embodiment.

FIG. 5 is a flow chart illustrating a method 500 for mitigating crosstalk in data signals received at a receiver module in an optical communication system, according to one example embodiment. The method 500 can be performed by a controller circuit (e.g., the controller circuit 118 or 158 in FIG. 1) of a receiver module (e.g., the transceiver module 102 or 104) in the optical communication system. At 502, the controller circuit (e.g., the controller circuit 158 in FIG. 1) extracts crosstalk data encoded in respective data signals in a respective optical channel. An Rx ring resonator (e.g., the Rx ring resonator 152 in FIG. 1) of the receiver module receives the respective data signals in the optical domain, which are then detected by an Rx photodetector (e.g., the Rx photodetector 160). The Rx photodetector converts the optical data signals into electrical data signals and sends the electrical data signals to the controller circuit. The controller circuit extracts the crosstalk data encoded in the respective data signals. At 504, the controller circuit subtracts the crosstalk data from data signals received prior to the respective data signals. These techniques allow the receiver module to mitigate crosstalk in the data signals generated at the Tx ring resonator of the transmitter module when the Tx ring resonator encodes data signals for optical channels.

In summary, the techniques disclosed herein provide solutions to communicate temperature parameters and crosstalk data of a transmitter module from the transmitter module to a receiver module to enable the receiver module to adjust its temperature parameters and to mitigate crosstalk in the received data signals. These techniques enable forward error correction to be implemented in the physical layer to improve data communication stability and accuracy.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality.

In general, the word "component," "engine," "system," "database," "data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

In common usage, the term "or" should always be construed in the inclusive sense unless the exclusive sense is specifically indicated or logically necessary. The exclusive sense of "or" is specifically indicated when, for example, the term "or" is paired with the term "either," as in "either A or B." As another example, the exclusive sense may also be specifically indicated by appending "exclusive" or "but not both" after the list of items, as in "A or B, exclusively" and "A and B, but not both." Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. An optical transceiver module comprising:
    a light source configured to emit light;
    a transmitter resonator configured to transmit light signals from the light source;
    a temperature sensor configured to detect temperatures of the transmitter resonator; and
    a controller circuit configured to:
        obtain a first temperature variation value based on the detected temperatures; and
        encode the first temperature variation value via the transmitter resonator in an outgoing data stream.

2. The optical transceiver module of claim 1, wherein the transmitter resonator includes a ring resonator.

3. The optical transceiver module of claim 1, wherein the controller circuit is further configured to:
    periodically extract first temperature variation values based on the detected temperatures; and
    encode the first temperature variation values via the transmitter resonator in outgoing data streams.

4. The optical transceiver module of claim 1, further comprising:
    a receiver resonator configured to receive an incoming data stream; and
    a heater coupled to the receiver resonator to adjust a temperature of the receiver resonator,
    wherein the controller circuit is further configured to:
        extract a second temperature variation value from the incoming data stream; and
        control the heater to adjust the temperature of the receiver resonator based on the second temperature variation value.

5. The optical transceiver module of claim 4, wherein the receiver resonator includes a ring resonator.

6. The optical transceiver module of claim 1, wherein:
    the transmitter resonator is configured to output signals in a plurality of optical channels, each of the optical channels being operated with a different wavelength; and
    the controller circuit is further configured to:
        compare signals from a first optical channel operated with a longest wavelength among the optical channels with signals from a second optical channel next to the first optical channel;
        extract crosstalk data imposed on the second optical channel by the signals from the first optical channel based on the comparison; and
        encode the crosstalk data via the transmitter resonator in subsequent output signals in the second optical channel.

7. The optical transceiver module of claim 6, wherein the controller circuit is further configured to:
    compare signals from an $n^{th}$ optical channel with signals from an (n+1)th optical channel next to the $n^{th}$ optical channel;
    extract $n^{th}$ crosstalk data imposed on the (n+1)th optical channel by the signals from the $n^{th}$ optical channel; and
    encode the $n^{th}$ crosstalk data via the transmitter resonator in subsequent output signals in the (n+1)th optical channel.

8. The optical transceiver module of claim 6, wherein the controller circuit is configured to encode no crosstalk data in output signals in the first optical channel.

* * * * *